Nov. 12, 1957 H. C. BICKFORD 2,812,861
MEANS FOR OZONE TREATMENT OF LIQUIDS
Filed Feb. 9, 1954 2 Sheets-Sheet 2
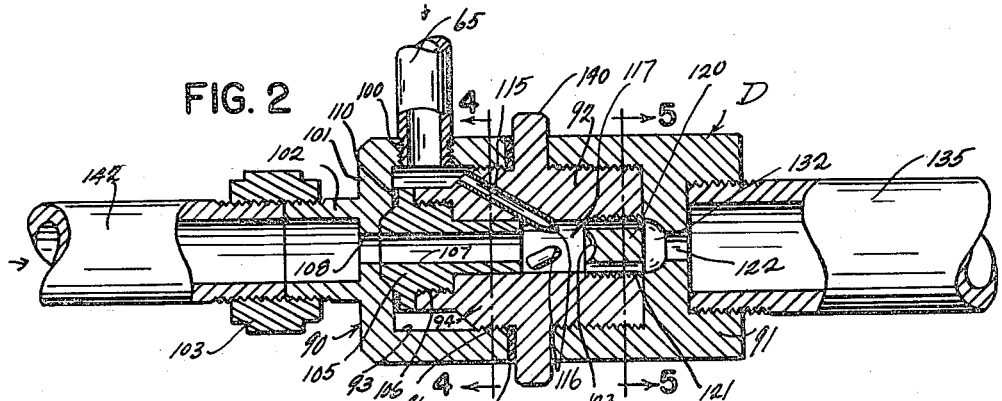
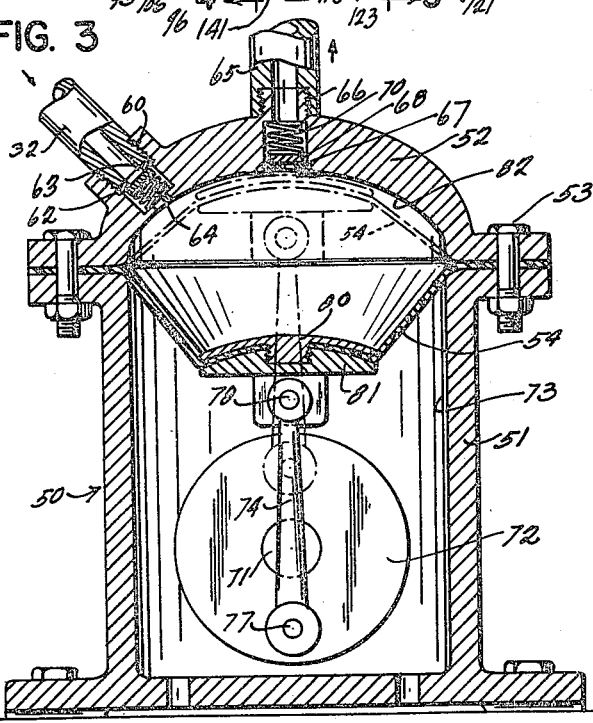
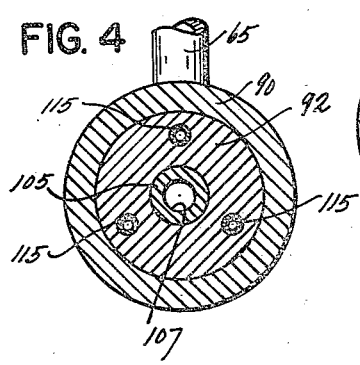
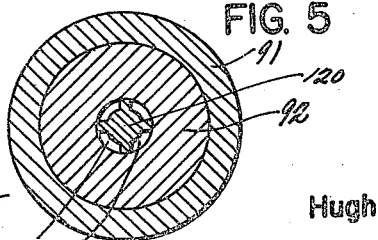
INVENTOR
Hugh C. Bickford
BY
ATTORNEYS

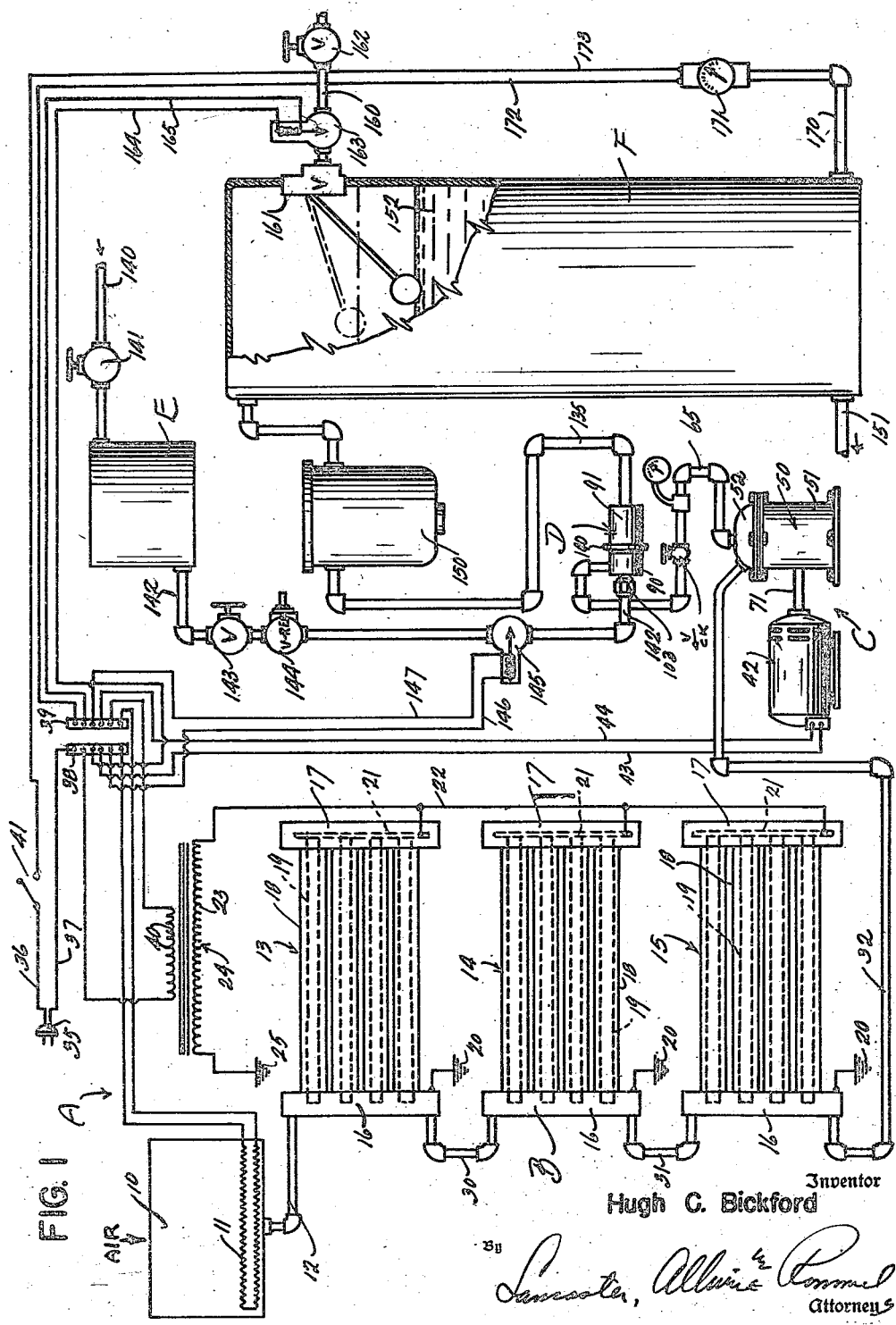

United States Patent Office 2,812,861
Patented Nov. 12, 1957

2,812,861

MEANS FOR OZONE TREATMENT OF LIQUIDS

Hugh C. Bickford, Kensington, Md., assignor to Maryland Laboratories, Incorporated, Kensington, Md., a corporation of Maryland Application February 9, 1954, Serial No. 409,113

3 Claims. (Cl. 210—120)

This invention relates to improvements in a system and means for the ozone treatment of materials for such purposes as sterilization, purification, deodorization, etc.

The primary object of this invention is the provision of an improved system and means for the treatment of liquids with ozone using a continuous flow jet treatment of liquid with ozone as set forth in U. S. Patent 2,660,559, dated November 24, 1953, and embodying improvements thereover in the provision of a diaphragm type pump to compress ozonized air for feed to an improved injector wherein an instantaneous and intimate atomized mixture of ozone and the liquid to be treated takes place. In order to obtain instantaneous and complete purification of the liquid it is necessary to obtain immediate contact between the molecules of ozone and the molecules of the liquid, which instantaneous and complete contact has not heretofore been possible with previous apparatus.

A further object of this invention is the provision of improved means for generating and compressing ozone, in gaseous phase, and injecting it in an extremely fine dispersion in the liquid to be treated and maintaining the same under superatmospheric pressure in a closed system wherein the venting of ozone and discharge of the treated liquid is efficiently controlled.

Other objects and advantages of this invention will be apparent during the course of the following detailed description.

In the accompanying drawings, forming a part of this specification, and wherein similar reference characters designate corresponding parts throughout the several views:

Fig. 1 is a diagrammatic view showing the various units of the improved apparatus and the wiring system used in connection therewith.

Fig. 2 is a longitudinal cross sectional view taken through an improved ozone-liquid injector for fine atomized dispersion of ozone in its gaseous phase into fluid or liquid to be treated.

Fig. 3 is a vertical cross sectional view taken through the diaphragm type of compressor-pump used in the treating system for pressure injection of ozonized air into the body of fluid or liquid to be treated.

Figs. 4 and 5 are transverse cross sectional views taken through the injector substantially on the lines 4—4 and 5—5 shown in Fig. 2 of the drawings.

In the drawings, wherein for the purpose of illustration is shown a preferred embodiment of the invention, the letter A may generally designate the improved apparatus for the ozone gas treatment of fluids and liquids. It includes an ozone generator B; motor-compressor arrangement C; injector D; filter E for the filtering of the liquid to be treated prior to entrance to the injector D, and a pressure tank F for storing the ozone-treated liquid.

It has been set forth in U. S. Patent 2,660,559, dated November 24, 1953, that it is a very considerable problem in the art relating to ozone purification treatment of liquids, to provide equipment which will be maintained in continuous and efficient operating condition, because of the destructive effects of ozone upon the materials of conventional compressors. In said U. S. patent, this difficulty has been overcome largely through the use of a synthetic silicone fluoride lubricant in the compressor, to prevent ozone corrosion and destruction of the parts of the compressor. In the present system I provide a diaphragm type of compressor which has been found in practice to solve the problem of adequately compressing ozone for use in the system.

Referring to the ozone generator unit B, the same preferably includes an air filter and dehydrator 10, as shown in Fig. 1, the air entering as indicated by the arrow in that view. This filter 10 is provided with a dehydrating heating coil 11. The dry filtered air passes through a sealed conduit 12 into ozone generating units 13, 14 and 15.

Each of the units 13, 14 and 15 may include headers 16 and 17 supporting thereon ozone generating tubes, each of which may include an outer tube 18 and a central electrode 19. The header 16 may be grounded in the electric circuit of the system, at 20, and in the headers 17 of each of the ozone generating units there may be provided a conductor 21 for the central electrodes 19, as shown in Fig. 1. These conductors 21 are connected in a line 22 leading to the secondary winding 23 of a transformer 24; the other end of the secondary being grounded at 25.

Air passes through line 12 into the units 13, 14 and 15, and enters the various tubes between the outer electrode-dielectric tube construction and the central electrode, wherein it is subjected to ionization, through silent discharge and arcing of the current between the electrodes. The various tubes of the units 13, 14 and 15 may be connected in parallel or in series. Thus, the ozonized air may flow zigzag through each unit, or it may be passed directly into the header 16 of the unit 13 and the ozone then transferred through a connection 30 into the unit 14, and the ozonized air then passed through a like connection 31 into the unit 15. The latter unit has a line 32 leading into and connecting with the motor-compressor C.

The electric setup of the system preferably includes a power attaching plug 35 having line connections 36 and 37 leading therefrom. In the system a pair of bus bars 38 and 39 are employed; the secondary winding 40 of the transformer 24 being connected to the bus bars 38 and 39, as shown. A manually controlled switch 41 may be placed in the circuit as shown in Fig. 1.

The motor-compressor C includes a motor unit 42 having an electrical connection through lines 43 and 44 with the bus bars 38 and 39. It also includes a compressor unit 50 preferably having a cylindrical casing portion 51 with bottom flanges for attachment to a suitable base. A detachable head 52 is connected to the casing 51 by means of bolts 53. Between the flanges of the casing 51 and 52, a flexible pumping diaphragm 54 is clamped by the bolts 53. The material of the diaphragm 54 is important. It is preferably constructed of some flexible synthetic compounded resin, such as "Tygon" or "Teflon." Any flexible synthetic compound can be used if it is resistant to the destructive effects of ozone.

"Teflon" is a trademark owned by E. I. du Pont de Nemours and Company, Inc. of Wilmington, Delaware, used upon a polymerized tetrafluoroethylene synthetic plastic. "Tygon" is a trademark owned by United States Stoneware Company of Akron, Ohio, and used upon a polymerized vinyl chloride-vinyl acetate composition. Both of these trademarks and the compositions thereof are nationally known and identified in "Handbook of Plastics"—Simonds, Weith and Bigelow—

2nd edition—D. Van Nostrand Company, Inc. of New York city, New York.

The line 32 leading from the battery of ozone generator units is connected at 60 (see Fig. 3) in the head 52 of the compressor 50. A valve mechanism is placed in the head 52 for the admission of ozone between the inner walls of the head 52 and the diaphragm 54. This valve includes a valve disc 62, preferably of some ozone resistant metal, such as stainless steel or aluminium; the same being associated with a valve seat or ring 63 which may be secured in the opening of the head 52 wherein the pipe 32 is connected. The valve seat 63 is preferably of "Tygon" or "Teflon," or equal compounded resin of a flexible nature which is resistant to effects of ozone. The valve member or disc 62 is normally maintained against the seat 63 by means of a stainless steel spiral spring 64, under compression to prevent entrance of ozonized air to the pump except under suction influence of the diaphragm 54.

The compressor unit 50 has an outlet line 65 connected at 66 to a nipple centrally on top of the head 52. The head 52 is provided with a valve seating ring 67 of "Tygon" or "Teflon" or equal, adapted to receive thereon a valve member or disc 68, of stainless steel, aluminium or other ozone resistant material. This valve is normally seated against the ring 67 by means of a stainless steel spiral compression ring 70, located in the head as shown in Fig. 3.

The shaft 71 of the motor unit 42 has a crank 72 rotatably mounted in the chamber 73 of the casing 51. It is connected by a rod 74 to the diaphragm 54, for operating and flexing the latter. The pivot connection of the rod 74 to the crank 72 is at 77 and the connection of the rod 74 to the diaphragm 54 is at 78.

The diaphragm 54 is detachably connected centrally to the connecting rod at opposite sides by means of sealing discs 80 and 81. They are made of aluminum or stainless steel, or some material resistant to the destructive effects of ozone. The head 52 may also be made of aluminium or stainless steel or the inner ozone contact walls 82 thereof coated or treated to resist the destructive effects of ozone thereon.

If desired I may use upon the movable parts of the compressor some synthetic lubricant which will not deteriorate under the destructive effects of ozone, such as silicone fluorides of the types described in the above identified copending applications.

The motor 42 reciprocates and flexes the diaphragm 54 between the full line and dot and dash line positions shown in Fig. 3 for drawing ozonized air through the line 32 into the pump and thence discharging it under pressure into the line 65 leading to the injector D.

The injector unit D is a considerable improvement because of its ability to obtain optimum dispersion of ozone in liquid, such that during the continuous flow treatment of the liquid a maximum atomized area contact of the same with the ozonized air is obtained. To that end the injector D includes a pair of casing sections 90 and 91, coupled together by an intermediate nozzle and baffle supporting member 92. The casing portion 90 has a chamber 93 provided with a screw threaded passageway 96 adapted to receive the screw threaded end 94 of the member 92. The ozone transmission line 65 connects laterally at 100 in the casing portion 90 for admission of ozone to the chamber 93.

At its end wall 101 the casing portion 90 has a water line connecting nipple 102 which may receive a union or coupling 103 for connecting the water line 142 thereto.

A tubular adapter 105 is located in the chamber 93, being threaded at 106 in the internally threaded passageway of the member 92. The adapter 105 has a passageway 107 therethrough which is calibrated to permit a stream of water of the proper cross section to pass therethrough into the mixing chamber, and which passageway 107 aligns with a similar passageway 108 in the end wall 101 of member 90.

The threading of the member 92 in the casing portion 90 moves the adapter 105 against the inner surfaces of the wall 101, and at that location a gasket 110 is placed, to seal off the ozone chamber 93 surrounding the adapter from the water passageway. This gasket 110 is preferably of "Tygon" or "Teflon," or some similar compounded synthetic resin which will perform the functions of a gasket and resist the destructive effects of ozone.

The nozzle supporting member 92 is provided with jet nozzles 115 thereon, each having a calibrated orifice 116 which enters the mixing chamber 117, in the member 92, as shown in Fig. 2. The nozzles 115 are tubular in form and are relatively convergent from their communicating points in the chamber 93 to their orifice ends located in the mixing chamber 117. The orifices of these tubes 115 are located in the same plane at right angles to the axis of the injector and open into the mixing chamber 117 at the extreme outer surface line of the passageway 107 extended, for the purpose of most efficiently forcing the ozonized air into the stream of water entering the mixing chamber from the adapter, directly at the outer surface edge of said stream.

A baffle plug 120 is detachably threaded at 121 in the exit end portion of the member 92. It presents a concaved baffle recess 123 directly facing the orifices of the nozzles 115. The plug 120 is spidered, as shown in the cross sectional view of Fig. 5, providing passageways 130 for transmission of the finely dispersed and intermixed ozone and liquid into the chamber 132 of the casing section 91. The section 91 has a liquid discharge passageway 122 opening into the line 135 connected therewith, for transmitting the ozone treated liquid to the storage tank F.

The casing portions 90 and 91 are threaded upon the nozzle supporting member 92; the latter being provided with an annular flange 140 lying between the adjacent ends of said casing portions. This flange may be provided with gaskets, but only one is shown at 141, at the ozone entering side of the injector. It may be of "Teflon" or "Tygon."

It has been set forth in the above identified U. S. Patent 2,660,559 that injection of ozonized air under super-atmospheric pressure and at high velocity is necessary in order to obtain the smallest possible dispersion of the ozonized air into the liquid to be treated, and thus to obtain the largest possible contact area and diffusion of the ozonized air in the liquid. Velocities of any given volume are controlled by the superatmospheric pressure of the ozonized air, the pressure of the liquid to be treated, and by the orifice size 116 in the ozone nozzles 115. Under normal conditions the pressure of the ozonized air entering the injector will be from 40 to 60 lbs. per square inch, and the liquid to be purified will be fed into the injector at from 20 to 30 lbs. per square inch. Tests have indicated that the ozonized air pressure should be substantially twice that of the pressure of the liquid. By way of example, if the water pressure is 25 lbs. per square inch, the ozonized air pressure should be substantially 50 lbs. per square inch. Under these circumstances, with 8 liters of air ozone per minute being pumped, the orifice in each of the three jets should be substantially .01 of an inch, or in a single jet the orifice to obtain the same jet speed should be substantially .023 of an inch in diameter. The speed of the ozonized air increases as the pressure is raised and/or the orifice size decreases. It has been found that the best mixture is obtained at the speed of sound and the pressures, volume, and orifice sizes should be controlled to produce approximately this speed. However, tests have indicated that any velocity of injection in excess of 400 feet a second produces good practical results in obtaining a complete mixture. The water feed passageway 107 in the adapter 105 should be ¼ of an inch in diameter. This will permit 5 gallons of water per minute to pass at high velocity into the mixing chamber 117 where the same is struck crosswise and diagonally by the ozonized superatmospheric gas then travelling at substantially the speed of sound, which has been found by test to produce the most complete atomizing effect of the ozonized-air with the liquid and thus a complete mixture of ozone with the liquid. This will cause a compelte atomization of the liquid and gas striking in the baffle recess 123. The atomized mixture is forced through the passageways provided in plug 120.

It has been found that with injector D a complete mechanical mixture of ozone and the liquid is effected so that apparently every molecule of water is contacted with ozone, thus obtaining complete purification of the liquid. The injector permits the use of small quantities of ozone in comparison to some conventional ozone treating methods. It has been found that a small quantity of ozone on the order of 50 milligrams in 8 liters of air per minute, injected into 5 gallons of water per minute, completely eliminates hydrogen sulfide from impure water. This is brought about by complete and optimum mixture contact of ozone gas with the liquid.

The water to be treated enters filter tank E through a line 140 wherein a hand valve 141 is provided. It then passes through the line 142 into the injector D. In line 142 is placed a manually operated valve 143 and a pressure regulating valve 144 adapted to maintain the water under desired superatmospheric pressure. An electromagnetically actuated valve 145 is also located in the line 142 between the pressure reducing valve 144 and injector D. This is a conventional solenoid valve and has current transmission lines 146 and 147 connected upon bus bars 38 and 39.

In the line 135 for transmitting the ozone-water mixture to the storage tank F there is located a second filter 150. The ozone-liquid is fed into the top of the tank F.

The tank F is vertically elongated and has a bottom pure liquid outlet line 151. The ozone-water mix, designated at 152 in the tank, is maintained under superatmospheric pressure. Line 151 may have a valve therein.

A gas vent line 160 is connected to the upper part of the tank F, above the normal level of liquid therein. A float control valve 161 is placed in line 160 at its tank connection for the purpose of closing off the vent line when the level of the liquid is at maximum high. In vent line 160 I prefer to place a manually operated valve 162, and between the valves 161 and 162 is located an electromagnetically operated valve 163. It is a conventional solenoid type of valve having current conducting lines 164 and 165 leading to bus bars 38 and 39. The provision of this electromagnetically operated valve will insure a closing of the vent line 160 as soon as the system is shut off, for the maintenance of the ozone-liquid in the tank under desired superatmospheric pressure, thus preventing too free dissipation of the gaseous ozone.

The tank F in its lower portion may have a pipe line connection 170 wherein is located a pressure regulating valve 171 having current line connections 172 and 173 at the bus bars 38 and 39 for the purpose of rendering the system inoperative should undue pressure exist in the tank.

Operation of the described system, from beginning to end, is a continuous flow system which instantaneously purifies the liquid being treated. It is quick in action, efficient, requiring little maintenance expense because of the safe guards taken against destructive effects of ozone upon the vital parts of the equipment.

The electromagnetically actuated valves are normally loaded to assume a closed position.

Various changes in the shape, size and arrangement of parts may be made to the form of invention shown, and variations in the steps of the method of treating the liquid with ozone may be made, without departing from the spirit of the invention or scope of the claims.

What is claimed is:

1. In apparatus for the ozone gaseous phase treatment of liquids the combination of an electric ozone generator, a compressor, means connecting the compressor to the ozone generator for receiving ozone therefrom and placing the same under superatmospheric pressure, an injector, means for passing the pressurized ozone into the injector, means for passing liquid to be treated into the injector, means in the injector for the finely dispersed high velocity injection of ozone into the liquid therein, a storage receptacle, means for discharging the intermixed ozone and liquid from the injector into the storage receptacle, and valve means operatively connected with the ozone generator for venting of gas from the said receptacle only when the ozone generator is in operation.

2. Apparatus as described in claim 1 in which a float actuated valve means is provided, controlled by the level of liquid in said receptacle for venting of gas from the tank through said first mentioned valve means.

3. A system for the ozone treatment of liquids comprising an electrical ozone generator, means for filtering and drying air fed to the generator, a diaphragm type pump connected to the ozone generator for receiving ozone-air therefrom and compressing the same, an injector, means for feeding pressurized ozone from the compressor to the injector, means for feeding a liquid to be treated under superatmospheric pressure to the injector including a supply line, an electromagnetically operated normally closed loaded valve in said supply line, a storage tank, means in the injector for the finely dispersed and atomized injection of ozone into the liquid to be treated, means for passing the ozonized liquid into the storage receptacle, means for venting gas from the storage receptacle above the normal level of liquid therein including a liquid level float actuated valve and an electromagnetically actuated normally closed loaded valve, and a wiring system for the ozone generator having the electromagnetically actuated valve circuit connected therein whereby to open said valve only when the ozone generator is in operation.

References Cited in the file of this patent

UNITED STATES PATENTS

| 382,156 | Hanford | May 1, 1888 |
| 996,560 | Bradley | June 27, 1911 |
| 1,044,653 | Held | Nov. 19, 1912 |
| 1,090,044 | Fuss | Mar. 10, 1914 |
| 1,358,084 | Leigh | Nov. 9, 1920 |
| 1,599,006 | Burgess | Sept. 7, 1926 |
| 1,737,623 | Thomson | Dec. 3, 1929 |
| 1,810,131 | Daily | June 16, 1931 |
| 1,839,952 | Daily | Jan. 5, 1932 |
| 1,853,045 | Gnau | Apr. 12, 1932 |
| 1,964,942 | Hallgarth | July 3, 1934 |
| 2,043,701 | Hartman | June 9, 1936 |
| 2,660,559 | Prime | Nov. 24, 1953 |

FOREIGN PATENTS

| 778,701 | France | Jan. 2, 1935 |